United States Patent
Nandan

(10) Patent No.: US 10,387,457 B2
(45) Date of Patent: *Aug. 20, 2019

(54) GRID-BASED ANALYSIS OF GEOSPATIAL TRAJECTORIES

(71) Applicant: SAP SE, Walldorf (DE)

(72) Inventor: Naveen Nandan, Singapore (SG)

(73) Assignee: SAP SE, Walldorf (DE)

( * ) Notice: Subject to any disclaimer, the term of this patent is extended or adjusted under 35 U.S.C. 154(b) by 704 days.

This patent is subject to a terminal disclaimer.

(21) Appl. No.: 14/307,442

(22) Filed: Jun. 17, 2014

(65) Prior Publication Data

US 2015/0363508 A1    Dec. 17, 2015

(51) Int. Cl.
  *G06F 17/00* (2006.01)
  *G06F 16/29* (2019.01)
  *G06F 16/22* (2019.01)

(52) U.S. Cl.
  CPC .......... *G06F 16/29* (2019.01); *G06F 16/2228* (2019.01)

(58) Field of Classification Search
  CPC ............... G06F 17/30424; G06F 17/30241
  USPC ........................................................ 707/743
  See application file for complete search history.

(56) References Cited

U.S. PATENT DOCUMENTS

| | | | | |
|---|---|---|---|---|
| 3,724,079 A * | 4/1973 | Jasperson | ............ | G01C 21/22 33/1 SD |
| 5,749,545 A * | 5/1998 | Gnatjuk | ............ | B64G 1/361 244/164 |
| 6,246,360 B1 * | 6/2001 | Brand, Jr. | ............ | B64G 3/00 342/352 |
| 6,385,539 B1 | 5/2002 | Wilson et al. | | |
| 6,437,696 B1 | 8/2002 | Lemelson et al. | | |
| 6,862,526 B2 * | 3/2005 | Robbins | ............ | G01S 5/009 340/995.21 |

(Continued)

FOREIGN PATENT DOCUMENTS

| | | |
|---|---|---|
| CN | 102646070 A | 8/2012 |
| CN | 102880719 A | 1/2013 |

OTHER PUBLICATIONS

Fosca Giannotti et al., Unveiling the complexity of human mobility by querying and mining massive trajectory data, The VLDB Journal, 2011, Springer-Verlag.

(Continued)

*Primary Examiner* — Eliyah S Harper
(74) *Attorney, Agent, or Firm* — Buckley, Maschoff & Talwalkar LLC

(57) ABSTRACT

Described herein is a framework for analyzing geospatial trajectory data. In accordance with one aspect, a grid model of a geographical area of interest is generated in response to a user event. The grid model includes a grid having a plurality of rows and columns of cells, in which the cells may be identified by unique cell numbers. Geospatial trajectory data of users may be mapped to the cells in the grid to generate mapped data with unique cell numbers associated to the geospatial trajectory data. The mapped data may further be analyzed to identify cell transitions based on the mapped data. Identifying the cell transitions includes determining cell density sequences and cell dwell-time sequences of the users. The cell density and cell dwell-time sequences may further be analyzed to perform a similarity analysis. Results of the similarity analysis may be presented to the end-user device of a user.

17 Claims, 10 Drawing Sheets

(56) References Cited

U.S. PATENT DOCUMENTS

| | | | |
|---|---|---|---|
| 7,068,819 B1* | 6/2006 | Matson | G06T 17/05 340/995.1 |
| 8,214,371 B1* | 7/2012 | Ramesh | G06F 17/30241 707/743 |
| 8,229,470 B1 | 7/2012 | Ranjan et al. | |
| 8,498,953 B2 | 7/2013 | Lehmann et al. | |
| 8,612,134 B2 | 12/2013 | Zheng et al. | |
| 8,719,198 B2* | 5/2014 | Zheng | G01C 21/20 706/21 |
| 2001/0000806 A1* | 5/2001 | Carr | A01C 7/102 702/2 |
| 2006/0177105 A1* | 8/2006 | Bowling | G09B 29/007 382/113 |
| 2007/0005419 A1 | 1/2007 | Horvitz et al. | |
| 2007/0263566 A1* | 11/2007 | McHenry | H04W 16/14 370/329 |
| 2009/0198746 A1* | 8/2009 | Hintze | G06F 17/30 |
| 2010/0114484 A1* | 5/2010 | Kida | G06F 17/30241 701/532 |
| 2010/0205226 A1* | 8/2010 | Bezancon | G06F 17/30241 707/803 |
| 2011/0010674 A1* | 1/2011 | Knize | G01C 21/20 715/849 |
| 2011/0029900 A1* | 2/2011 | Ngo | G01C 21/20 715/764 |
| 2011/0227699 A1* | 9/2011 | Seth | G06Q 30/02 340/8.1 |
| 2012/0185206 A1* | 7/2012 | Zehler | G09B 29/10 702/150 |
| 2013/0117266 A1* | 5/2013 | Yahalom | G06F 17/30265 707/737 |
| 2013/0297726 A1* | 11/2013 | Ross | H04L 67/18 709/217 |
| 2014/0108320 A1 | 4/2014 | Baca et al. | |
| 2014/0188775 A1 | 7/2014 | Lehmann et al. | |
| 2014/0206393 A1 | 7/2014 | Lerenc | |
| 2014/0207375 A1 | 7/2014 | Lerenc | |
| 2014/0243020 A1 | 8/2014 | Lerenc | |
| 2014/0243021 A1 | 8/2014 | Lerenc | |
| 2014/0365246 A1* | 12/2014 | Hayward | G06Q 40/08 705/4 |

OTHER PUBLICATIONS

Yu Zheng et al., GeoLife: A Collaborative Social Networking Service among User, Location and Trajectory, IEEE Data Engineering Bulletin, 2010.

Quannan Li et al., Mining User Similarity Based on Location History, Proceedings of the 16th ACM SIGSPATIAL International Conference on Advances in Geographic Information Systems, 2008, ACM, CA, USA.

Josh Jia-Ching Ying et al., Mining User Similarity from Semantic Trajectories, ACM LBSN, Association for Computing Machinery, ACM, Nov. 2010, CA, USA.

Yu Zheng et al., Mining Interesting Locations and Travel Sequences from GPS Trajectories, Proceedings of International conference on World Wild Web (WWW 2009), Apr. 2009, ACM, Madrid, Spain.

Yu Zheng et al., Understanding Mobility Based on GPS Data, Proceedings of ACM conference on Ubiquitous Computing (UbiComp'08), Sep. 2008, ACM, Seoul, Korea.

Xiangye Xiao et al., Finding Similar Users Using Category-Based Location History, ACM SIGSPATIAL GIS, Nov. 2010, Association for Computing Machinery, Inc., CA, USA.

Hechen Liu et al., Similarity Measurement of Moving Object Trajectories, Proceedings of ACM SIGSPATIAL Workshop on GeoStreaming (IWGS), 2012, CA, USA.

Leaflet, http://leafletjs.com/, 2010.

OPENUI5, http://sap.github.io/openui5/, SAP SE, 2014.

Sap Hana, http://www.saphana.com/, SAP SE, 2012.

* cited by examiner

GPS logs (longitude/latitude)

| USER_ID | RECORDED_TIME | LOCATION_2D |
|---|---|---|
| 000 | Oct 23, 2008 2:53:04.0 AM | POINT (116.31841699965298 39.98470200003944464) |
| 000 | Oct 23, 2008 2:53:10.0 AM | POINT (116.31845000013709 39.98468299995512960) |
| 000 | Oct 23, 2008 2:53:15.0 AM | POINT (116.31841699965298 39.98468600002726320) |
| 000 | Oct 23, 2008 2:53:20.0 AM | POINT (116.31838500003406 39.98468799998221990) |
| 000 | Oct 23, 2008 2:53:25.0 AM | POINT (116.31826299987733 39.98465500026941300) |
| 000 | Oct 23, 2008 2:53:30.0 AM | POINT (116.31802599970251 39.98461099993437500) |
| 000 | Oct 23, 2008 2:53:35.0 AM | POINT (116.31776100024581 39.98460800014436200) |

GRID-BASED ANALYSIS OF GEOSPATIAL TRAJECTORIES

TECHNICAL FIELD

The present disclosure relates generally to intelligent tools. In particular, an intelligent tool includes a data analysis tool to identify similarities between or among trajectories of different users.

BACKGROUND

The proliferation of mobile devices and advancement in location detection technologies enables the generation of location or trajectory data. For example, the location data may be spatial-temporal data, tracking movement and time of movement of mobile device users. Such data can be analyzed. However, a problem with spatial-temporal data is its sheer volume as well as its complexity. For example, the massive amount and complexity of the data make them difficult to analyze. Current techniques for indexing geospatial data makes it difficult to identify or derive patterns.

From the foregoing discussion, it is desirable to provide effective and efficient processing of massive amount of complex data, such as spatial-temporal data.

SUMMARY

A framework for analyzing trajectory data is described herein. In accordance with one aspect, a grid model of a geographical area of interest is generated in response to a user event. The grid model comprises a grid having a plurality of rows and columns of cells, in which the cells may be identified by unique cell numbers. Geospatial trajectory data of users may be mapped to the cells in the grid to generate mapped data with unique cell numbers associated to the geospatial trajectory data. The geospatial trajectory data may include 2-dimensional spatial-temporal data with longitude and latitude information related to trajectory of the users. The mapped data may further be analyzed to identify cell transitions based on the mapped data. Such analysis may further include determining cell density sequences and cell dwell-time sequences of the users, which may be analyzed to perform a similarity analysis. Results of the similarity analysis may be presented to the end-user device of a user.

In accordance with another aspect, a grid model of a geographical area of interest is generated in response to a user event. The grid model includes a grid having a plurality of rows and columns of cells, in which the cells may be identified by unique cell numbers. Geospatial trajectory data of users may be mapped to the cells in the grid to generate mapped data with unique cell numbers associated to the geospatial trajectory data. The mapped geospatial trajectory data may further be analyzed to identify cell transitions based on the mapped data. Identifying the cell transitions may include determining cell density and cell dwell-time information. The cell density and cell dwell-time information may be analyzed, in which the analysis includes user similarity mining.

In accordance with yet another aspect, a data analysis system is described. The data analysis system includes a database module and a data analyzer. The database module stores geospatial trajectory data of users as a data table, in which log entries of the geospatial trajectory data of the users correspond to rows in the data table. As for the data analyzer, it includes a modeling module, a characterization module and a mining module. The modeling module defines a grid covering a geographical area of interest, in which the grid includes a plurality of rows and columns of cells that may be uniquely identified by cell numbers. The modeling module may generate mapped data by mapping the log entries of the geospatial trajectory data to unique cell numbers. The characterization module may analyze the mapped data to determine cell transitions of log entries of the users, and the mining module may further analyze the cell transitions to determine similarities in the trajectories of the users.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

FIG. 3 shows an example of a raw data table of GPS logs;

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

A framework or application for analyzing trajectory data is described herein. For example, trajectory data of devices may be collected and analyzed. The trajectory data may be spatial-temporal data, tracking trajectories of devices, such as mobile devices. The trajectories represent trajectories of users associated with the devices. A grid-based model is used to analyze the trajectory data. The grid-based model utilizes a grid which encompasses the geographic location of interest. The grid may be a rectangular grid which encompasses the geographical location of interest. The grid is divided into rows and columns of cells, such as rectangular cells. The analysis of trajectory data can lead to development of various location-based services. The trajectory data, for example, may be analyzed to identify similarities (similarity mining) between trajectories of different users. This can lead to recommendations. For example, recommendations may include more convenient transportation routes, restaurants as well as new friends. The framework includes an interface, such as a web browser. The interface, in one implementation, is an interactive interface. The interactive interface enables display of the grid model which overlays the area of interest as well as results of the analysis based on user interaction or user commands.

Figure 1:
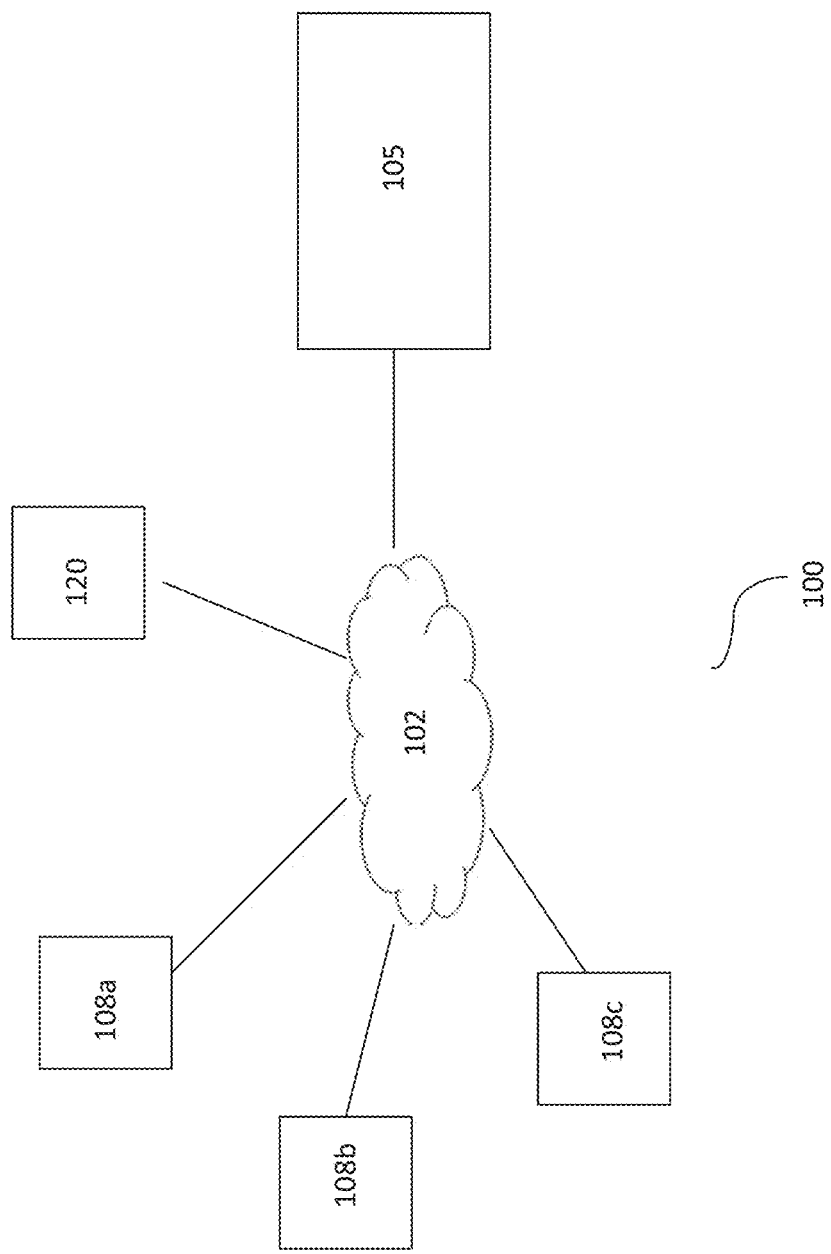
FIG. 1 shows an exemplary implementation of an environment.

FIG. 1 shows a block diagram of an exemplary environment 100. The environment, for example, facilitates trajectory data collection, trajectory data modeling and analysis of the modeled trajectory data. The environment may have a client/server architecture. For example, the environment may be a distributed client/server architecture. In one implementation, the environment includes one or more clients 108a-c and a server 105 communicatively coupled via a communication network 102. Clients 108a-c may access the server 105 to store information and/or retrieve information maintained on the server. Furthermore, the server 105 may facilitate communication between clients.

The communication network 102, for example, may be a local area network (LAN) which interconnects different devices, such as the clients 108a-c and the server 105. Other types of networks may also be useful. For example, the communication network may include a cloud network. The devices may be coupled via the network 102 by wireless and/or wired connections. Wireless connections may include WiFi or wireless telecommunication networks, such as 3G or 4G. Providing any combination of wired and wireless connections to the communication networks may be useful.

The server 105, in one implementation, may be a computer which includes a memory and a processor. The server is configured to transmit, receive, process and store information or data associated with the environment. Various types of computers may be employed. For example, the computer may be a mainframe, a workstation, as well as other types of processing devices. The server may be adapted to execute any operating system. For example, the operating system of the server may be z/OS, Linux-Intel, Linux/390, UNIX, or Windows Server. Other types of operating systems may also be used. The server may also include or be communicatively coupled with a web server and/or a Simple Mail Transfer Protocol (SMTP) server.

Although the environment is illustrated with one server, it is understood that more than one server, such as a server pool, as well as computers other than servers, may be employed. In other cases, the server may be a cloud server. For example, the server may be a pool of servers interconnected to provide a cloud server.

The memory of the server may include any memory or database module. The memory may be volatile or non-volatile types of memories, such as magnetic media, optical media, random access memory (RAM), read-only memory (ROM), removable media, or any other suitable local or remote memory component.

A client may be a mobile device. For example, a client may be a mobile device with location detection functionalities, such as a global positioning system (GPS) function. The mobile device may include a local memory and a processor. For example, the mobile device may be a smart phone or a tablet computer, such as an iPad. Other types of mobile devices may also be useful.

In some cases, a client may be a local or remote computing device with, for example, a local memory and a processor. The memory may include fixed and/or removable storage media such as a magnetic computer disk, a CD-ROM, or other suitable media. Various types of processing devices may serve as a client. For example, the client may be a PC, tablet PC, workstation, network computer, kiosk or personal data assistant (PDA). Other types of processing devices may also be used. The processing devices may include a memory and a processor. Input and output devices may be provided for the processing device. The input device may be, for example, a keypad, a touch screen, a mouse, or other devices that can accept information from a user. For example, a client may receive requests from a user using the input device. The output device may be a display to convey information to a user. Other types of input and output devices may also be useful. The clients can receive, transmit, process and store any appropriate data associated with the environment 100.

Client/server (C/S) applications may be provided in the environment. Generally, C/S applications include front end and back end portions. The front end portions are stored locally on the clients while the back end portions are located in the server. Various types of C/S applications may be provided in the environment.

A client may include a user interface for a user to interact with the environment for various purposes. For example, the interface may be used to access various applications in the environment. The user interface may also serve other purposes. In one implementation, the user interface comprises a graphical user interface (GUI). A GUI may provide an efficient and user-friendly manner of presenting information or communicating with the environment. For example, a GUI may include a task menu as well as one or more panes for displaying information. Other types of user interfaces, such as a command line interface (CLI), may also be useful. The type of user interface may depend on the type of application running on the client. For example, the front end portion may include a GUI which enables a user to interact with the back end portion to access data stored in the server.

Although the environment 100 is shown with three clients and one server, it is understood that there may be any number of clients communicatively coupled to one or more servers. Additionally, other types of devices may be included. The clients may be local or external clients. Furthermore, "client" and "user" may be used interchangeably as appropriate without departing from the scope of this disclosure. For example, a client may be used by one or more users while a user may use one or more clients. As an illustration, a user may have a user account for an application, such as an email system. Any user may access the user's respective account from any client by performing an authentication or a login process, such as providing a user name and password.

In one implementation, the environment 100 includes a data analysis system 120. The analysis system 120, for example, is adopted to analyze location data. The location data includes spatial and temporal information of mobile devices. The location data enables tracking of trajectories of users of mobile devices. In one implementation, the analysis system 120 employs a grid-based model which includes a grid encompassing an area of interest. The grid, in one implementation, is a rectangular grid with rows and columns of cells. For example, the grid is divided into rows and columns of rectangular cells. The location data, for example, may be mined to identify similarities between trajectories of different users. This can lead to recommendations based on similarities of user trajectories. For example, recommendations may include more convenient transportation routes, restaurants as well as new friends. The analysis system 120 may include an interface, such as a web browser. The interface, in one implementation, is an interactive interface, enabling a user to visualize results of the trajectory data analysis.

In one implementation, the analysis system 120 may have a C/S architecture. For example, modules related to storage, processing and analysis of data reside on the server while the user interface may reside on the client. Other configurations of the analysis system 120 may also be useful.

The environment 100 may also include other types of applications. For example, the environment may include business applications as well as communication applications, such as an email application. For example, C/S business applications may include SAP Business Objects applications from SAP AG. Other type of C/S business applications may also be useful.

Figure 2:
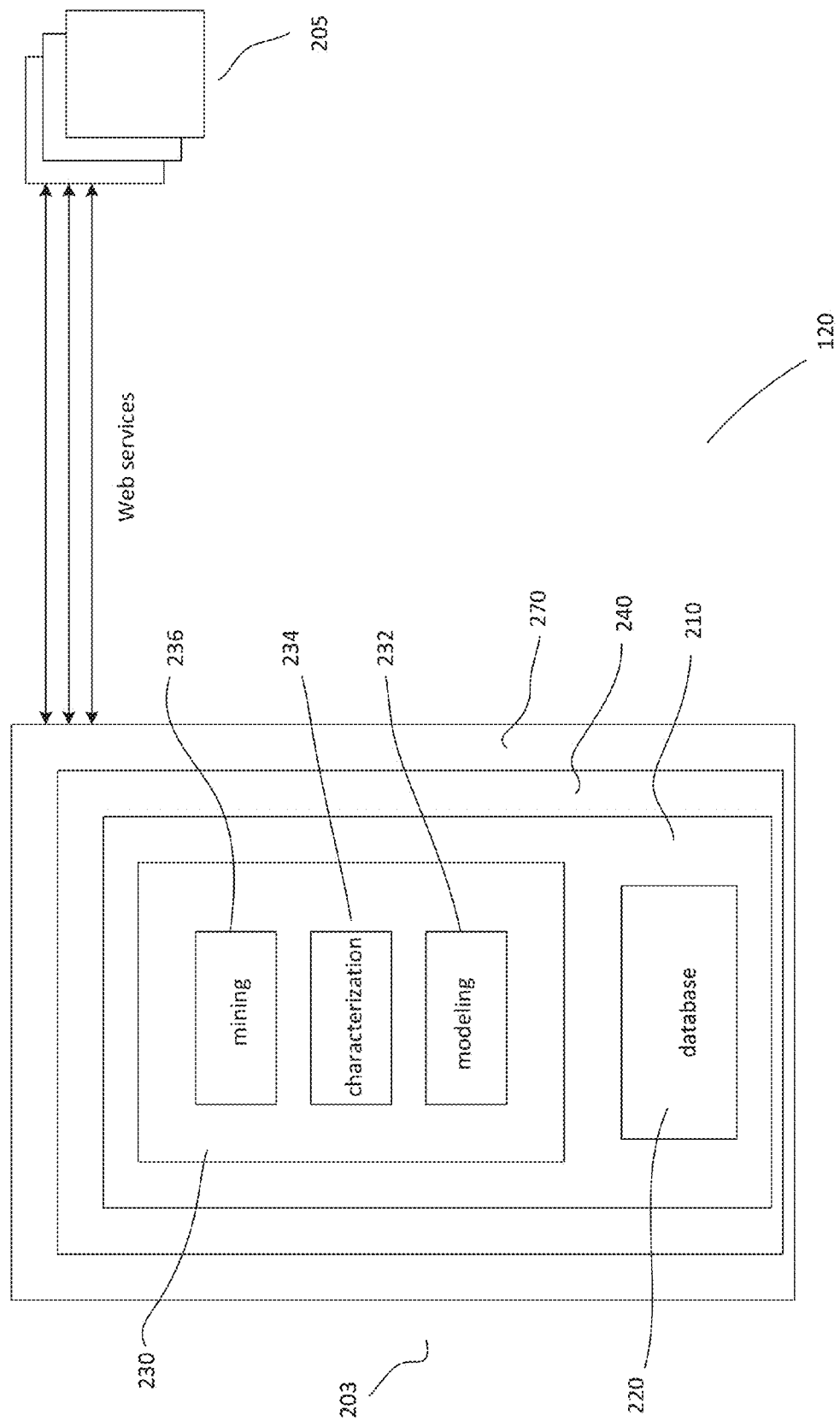
FIG. 2 shows an exemplary implementation of an analysis system.

FIG. 2 shows an architecture of an implementation of the data analysis system 120. The analysis system 120 may have a C/S architecture. For example, a back end portion 203 resides on a server while a front end portion 205 resides on a client. Other configurations for the system may also be useful.

As shown, the back end portion of the system includes first, second and third stages 210, 240 and 270. The first stage 210 includes a database 220 and a data analyzer 230. In one implementation, the data analyzer 230 includes a modeling module 232, a characterization module 234 and a mining module 236. Providing other types of modules for the data analyzer 230 may also be useful. The second stage 240 may include a layer to expose data of the first stage. For example, the second stage includes Javascript to expose the data. The third stage 270 includes a visualization application. For example, the visualization application may include web/mobile applications.

The front end portion includes an interface, such as an interactive interface. The interface, for example, may be a browser. Other types of interfaces may also be useful. The client communicates with the server side of the system through web services. The web services handle requests from the user via the user interface. Additionally, results of the data analyzer 230 may be visualized or displayed using leaflet maps. The leaflet maps are resident on the client.

The database 220 stores raw trajectory data. In one implementation, the database is a columnar in-memory database. For example, the database may be a SAP HANA database from SAP AG. Other types of database may also be useful. The raw trajectory data, in one implementation, is spatial-temporal trajectory data. The trajectory data tracks trajectories of mobile devices. The trajectories represent trajectories of users associated with the devices. The trajectory data, in one implementation, is stored as a table in the database. Storing the data in the database using other formats may also be useful. In raw format, the trajectory data includes various attributes. In one implementation, the raw data includes user id, recorded time and location information attributes. Each type of attribute forms a column in the table. Other attributes may also be useful. Additional attributes may be stored in the database. For example, if more semantic information is available, additional columns may be provided for such data. Such attributes may include travel mode, location description, as well as other information.

The user id, in one implementation, is an anonymized identifier of the user. The use of anonymized identifiers protects the privacy of users. Providing a non-anonymized identifier as a user id may also be useful. For example, non-anonymized identifiers may be used in the case where privacy is not a concern or an issue. Location data may be stored as points in 2-dimensional (2-D) space. For example, the location data may include latitude and longitude information such as WSG84 data. Other types or formats for location data may also be useful.

FIG. 3 shows an example of a table 300. The table contains data from GPS logs. As shown, the table includes columns for user id 310, recorded time 320 and location information 330. A row corresponds to a GPS log. The user id 310 includes an anonymous identifier, such as user '000'. The recorded time indicates the time of the log. The location data, for example, includes longitude and latitude coordinate points. Providing additional columns for other data as well as storing the data in other formats may also be useful.

The modeling module 232 models the trajectory data stored in the database 220. In one implementation, the modeling module 232 forms a pre-defined grid covering the area of interest. For example, the grid may be defined by a user through an interface. The grid is defined as a rectangle with latitude and longitudinal bounds of a map. In one implementation, the bounds of the grid are $lat_0=-180°$ to $lat_1=180°$ and $lon_0=-180°$ to $lon_1=180°$. The dimension of the grid depends on the size of the area of interest. For example, the bounds of the grid encompass the area of interest.

The grid is divided into rows and column of cells. For example, the grid is composed of rows and columns of cells. The cells are rectangular cells. The cells of the grid may be of the same size. Providing non-uniform sized cells in the grid may also be useful. For example, the heights of cells of a row are the same while the widths of cells of a column are the same. However, different rows may have different cell heights and different columns may have different cell widths. The number of rows and columns can be determined by a user, such as through the interface. The number of rows and columns depend on the desired granularity. For example, higher number of rows and columns within a given grid corresponds to higher granularity while lower number of rows and columns within a given grid corresponds to lower granularity. The cells are numbered, based on their spatial location. For example, a cell may be numbered $C_{RC}$, where subscript R corresponds to the row of the cell location and subscript C corresponds to the column of the cell location. Other cell numbering formats may also be useful. For example, any number format which identifies spatial location of the cells within the grid may also be useful.

Figure 4:
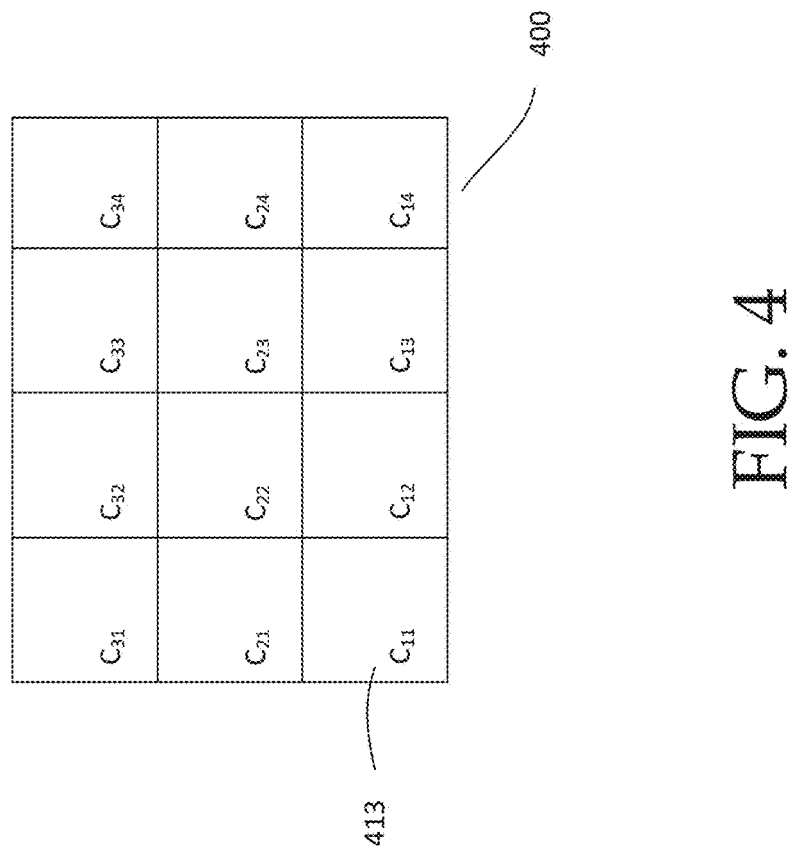
FIG. 4 shows an example of a grid.

FIG. 4 illustrates a simple example, of a grid 400. The grid is divided into a plurality of cells 413. As shown, the grid includes 3 rows and 4 columns of cells, resulting in 12 cells. The cells are numbered based on their row and column locations, as described. The granularity of the grid may be increased by increasing the number of rows and columns. This results in a smaller cell size. Conversely, the granularity of the grid may be decreased by decreasing the number of rows and columns in the grid, resulting in a larger cell size.

The modeling module 232 transforms or maps the raw 2-D data points stored in the database to fit them into the grid. In one implementation, the transformation reduces the 2-D data points to a 1 dimension (1-D) representation as a cell number in the grid. For example, any geo-location pair with latitude and longitude information can be transformed into a transformed or mapped data which is a cell number in the grid. The transformation is performed by the following equation (1):

$$gridX = \text{floor}\left[\frac{(lat - lat_1) * \text{rows}}{(lat_2 - lat_1)}\right] \quad (1)$$

$$gridY = \text{floor}\left[\frac{(lon - lon_1) * \text{columns}}{(lon_2 - lon_1)}\right]$$

$$\text{cell\_number} = ((\text{columns} * (gridX - 1)) + gridY)$$

where,
   gridX is the row index,
   gridY is the column index,
   lat is the latitude of the point,
   $lat_1$ and $lat_2$ are the latitude boundaries of the grid,
   lon is the longitude of the point,
   $lon_1$ and $lon_2$ are the longitude boundaries of the grid,
   rows is the number of rows in the grid (defines the row granularity of the grid),
   columns is the number of columns in the grid (defines the column granularity of the grid),
   floor is a mathematical function that rounds a decimal into the lowest near natural number, and
   cell_number is the cell number in the grid to which the transformed data belongs.

The transformation can be effected on the raw data using, for example, a SQL statement. For example, the SQL statement can be applied to the table containing the raw data. The transformation, for instance, may be effected as follows:

```
CREATE VIEW GridModel AS SELECT USER_ID,
RECORDED_TIME, LOCATION_2D.ST_X( ) as lon,
LOCATION_2D.ST_Y( ) as lat, FLOOR(((LOCATION_2D.ST_X( )-
lat₁)* rows)/(lat₂-lat₁)) AS gridX, FLOOR(((LOCATION_2D.ST_Y( )-
lon₁)* columns)/(lon₂-lon₁)) AS gridY FROM Locations;
CREATE VIEW GridModel_CellNumber AS SELECT USER_ID,
RECORDED_TIME, ((columns * gridY) + gridX) as cell_number
FROM GridModel
```

Effecting the transformation using other techniques may also be useful. The transformed data may be the raw data with an additional column corresponding to the cell number. The data may be a view generated using the original table. The transformed data may be exposed as a view to serve as input to the mining module 236. For example, the transformed data may be generated at run-time. The transformed data may be subsequently used for data analysis.

Figure 5:
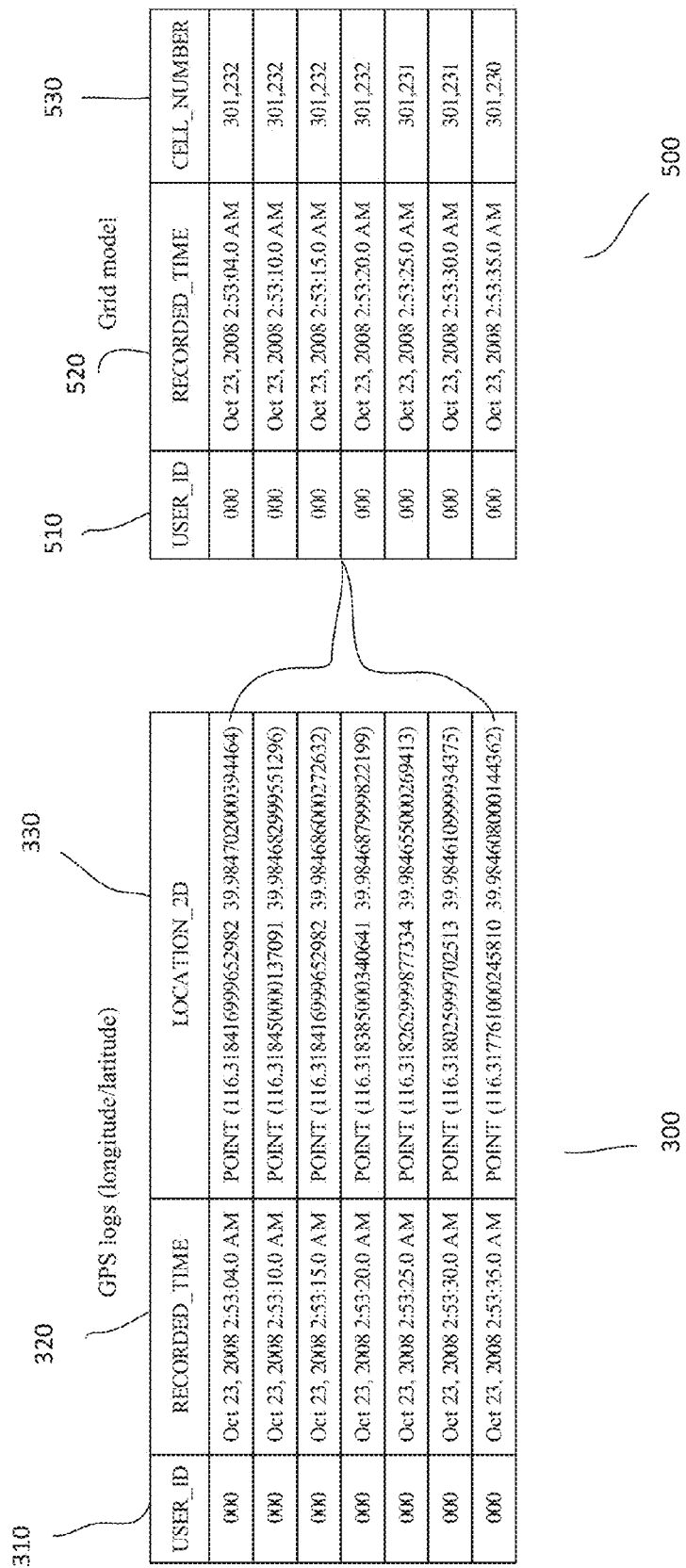
FIG. 5 shows an example of a grid model table.

FIG. 5 illustrates the progression to a grid model table 500 from a raw data table 300. The raw data table has already been described and will not be described or described in detail. As shown, the grid model table 500 includes columns for user id 510, recorded time 520 and cell number 530 information. The grid model is similar to table 300 except that the 2-D location information 330 is transformed to a 1-D cell number 530. A row corresponds to a transformed GPS log. The user id 510 includes an anonymous identifier, such as user '000'. The recorded time 520 indicates the time of the log. The cell number 530 denotes the cell corresponding to the location provided in the table 300 containing the raw data of the GPS logs. Providing additional columns for other data as well as storing the data in other formats may also be useful.

The characterization module 234 analyzes the transformed data. In one implementation, the characterization module 234 extends the model to include cell transitions. For example, the transformed data can be analyzed to identify cell transitions. A cell transition is defined as the movement of a user (e.g., a device) from one cell of the grid to another. The model is extended to include cell transitions for all users. A filter may be provided to determine cell transitions of selected user or users.

Extending the model to include cell transitions enables determination of cell density of location logs of users. Cell density is the number of location logs of a user recorded within a cell before making a transition to the next cell. A cell density sequence of a user can be determined from the logs of the user in the database. All logs, for example, may be used to determine cell density. Cell density sequences for all users can be queried from the extended model using SQL. For example, a windowing function implemented in SQL within the database, such as SAP HANA, can be used. For instance, the cell density sequences may be queried as follows:

```
SELECT user_id, recorded_time, cell_number, duration_in_seconds
FROM (
SELECT *, SECONDS_BETWEEN(recorded_time,
LEAD(recorded_time) OVER (ORDER BY user_id, recorded_time)) as
duration_in_seconds, LEAD(user_id) OVER (ORDER BY user_id,
recorded_time) as lead_user FROM (
SELECT TOP 1 user_id, recorded_time, cell_number FROM
GridModel_CellNumber UNION
SELECT user_id, recorded_time, cell_number FROM (
SELECT user_id, recorded_time, cell_number,
LAG(recorded_time) OVER (ORDER BY user_id, recorded_time) as
lag_time, LAG(cell_number) OVER (ORDER BY user_id,
recorded_time) as lag_cell FROM GridModel_CellNumber) WHERE
cell_number < > lag_cell OR SUBSTRING(RECORDED_TIME, 1,
10) < > SUBSTRING(lag_time, 1, 10))) WHERE user_id = lead_user
ORDER BY user_id, recorded_time;
```

Other techniques for querying user cell density sequences may also be useful.

A cell density table can be formed by the SQL. For example, the SQL can form a cell density table for the users. The cell density table, in one implementation, includes all users. The cell density table is similar to the grid model table 500, as described in FIG. 5. However, log entries having the same cell number are condensed to one log entry. An additional column is provided to indicate the density of logs in the cell to provide cell density information. This results in reducing the number of log entries as compared to the raw data table. In some cases, this can reduce the number of log entries by a significant number or percentage.

The number of location logs depends on the sampling rate of the data analysis system 120. Generally, the higher the sampling rate, the higher the number of location logs while a lower sampling rate results in a lower number of location logs. Additionally, the cell density may depend on the model's granularity. Generally, a higher granularity may result in a lower cell density while a lower granularity may result in a higher density.

Figure 6:
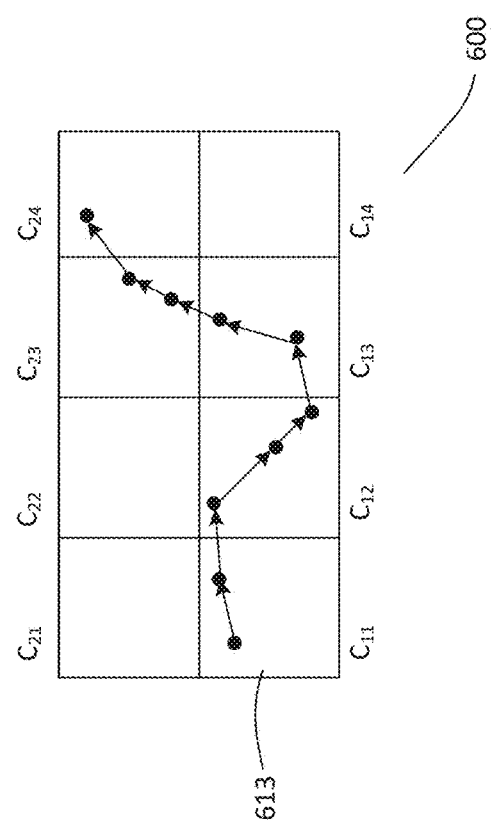
FIG. 6 shows an example of cell transitions on a grid.

FIG. 6 illustrates a simple example of extending the model to include cell transitions of a user. As show, the model includes a grid 600 with 2 rows and 4 columns of cells 613 (e.g., 2×4 grid). The logs of a user are plotted in the grid. A location log is represented by a dot in the grid. The lines connecting the dots represent the movement of the user. As discussed, each location log is transformed into a cell number. The cell density of $C_{11}$ is 2 logs, $C_{12}$ is 3 logs, $C_{13}$ is 2 logs, $C_{23}$ is 2 logs and $C_{24}$ is 1 log. This produces a cell density sequence $\{C_{11}(2), C_{12}(3), C_{13}(2), C_{23}(2)\ C_{24}(1)\}$.

Extending the model to include cell transitions enables determination of cell dwell time. Cell dwell-time is defined as the amount of time a user spends in a cell before making a cell transition. Cell dwell-time is analyzed for all users. For example, the sequence of cell transitions and corresponding dwell-time is determined for all users. The dwell-time may depend on the model's granularity. Generally, a higher granularity may result in a lower dwell-time while a lower granularity may result in a higher dwell-time.

A dwell-time table can be formed by the SQL. For example, the SQL can form a dwell-time table for the users. In one implementation, the dwell-time table contains dwell-times for all users. The dwell-time table is similar to the cell density table. However, the cell density column is changed to a dwell-time column. The dwell-time column contains the time in which the user remains in a cell before moving to another cell. This results in reducing the number of log entries as compared to the raw data table. In some cases, this can reduce the number of log entries by a significant number or percentage.

Figure 7:
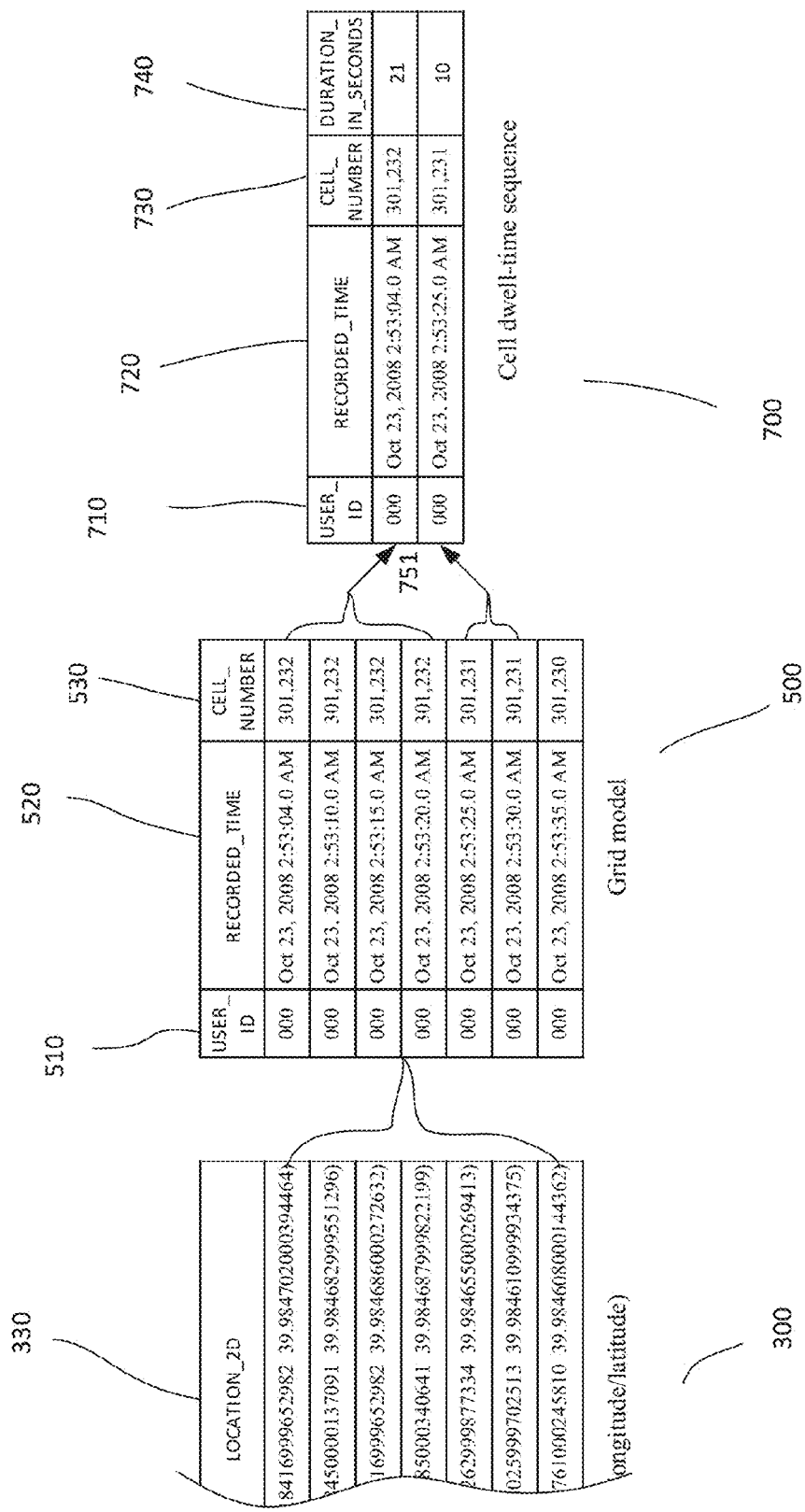
FIG. 7 shows an example of a grid model table with cell-dwell times.

FIG. 7 illustrates the progression to a cell dwell-time sequence table 700 from a raw data table 300 and a grid model table 500. The raw data and grid model tables have already been described and will not be described or described in detail. As shown, the cell dwell-time table 700 includes columns for user id 710, recorded time 720 and cell number 730 information. Unlike the grid model table, log entries having the same cell number are condensed to 1 log entry, as illustrated by bracketed arrows 751. An additional column 740 is provided to indicate the dwell-time of logs in the cell to provide dwell-time information. As shown, the dwell-time is provided in seconds. Providing dwell-time using other time granularities, such as minutes, may also be useful.

As clearly shown, the cell dwell-time sequence table 700 results in reducing the number of log entries as compared to the grid model or raw data table. In some cases, this can reduce the number of log entries by a significant number or percentage. In the example, the log entries are reduced to two from seven. This results in over 60% reduction over the grid model table 300.

In some implementations, the cell density and cell dwell-time tables may be combined into one table. For example, the cell dwell-time table may include an additional column for cell density data.

The mining module 236 mines the various tables to identify similarities between user trajectories. For example, the mining module 236 mines cell density and cell dwell-time data or the combined cell density/dwell-time data. The mining module 236 analyzes the table or tables to identify subsequences between user trajectories. A subsequence is defined as a user cell sequence that can be derived from another user cell sequence by deleting some cells without changing the order of other cells in the sequence.

In one implementation, similarity analysis employs a longest common subsequence (LCS) analysis. The LCS analysis extracts the longest cell subsequence between two user trajectories. The LCS algorithm is used to extract the longest such common cell subsequence between users. The LCS analysis, for any two user sequences X and Y, is in accordance with equation (2) as follows:

$$LCS(X_i, Y_j) = \begin{cases} \phi & \text{if } i = 0 \text{ or } j = 0 \\ LCS(X_{i-1}, Y_{j-1}) & \text{if } x_i = y_j \\ \text{longest}(LCS(X_i, Y_{j-1}), LCS(X_{i-1}, Y_j)) & \text{if } x_i \neq y_j \end{cases} \quad (2)$$

where,
i is the index of cell numbers for user X, and
j is the index of cell numbers for user Y.
The LCS analysis is applied in three stages as follows:
1) on the cell density sequence;
2) on the cell dwell-time sequence; and
3) on a combination the cell density and cell dwell-time sequence.

Figure 8:
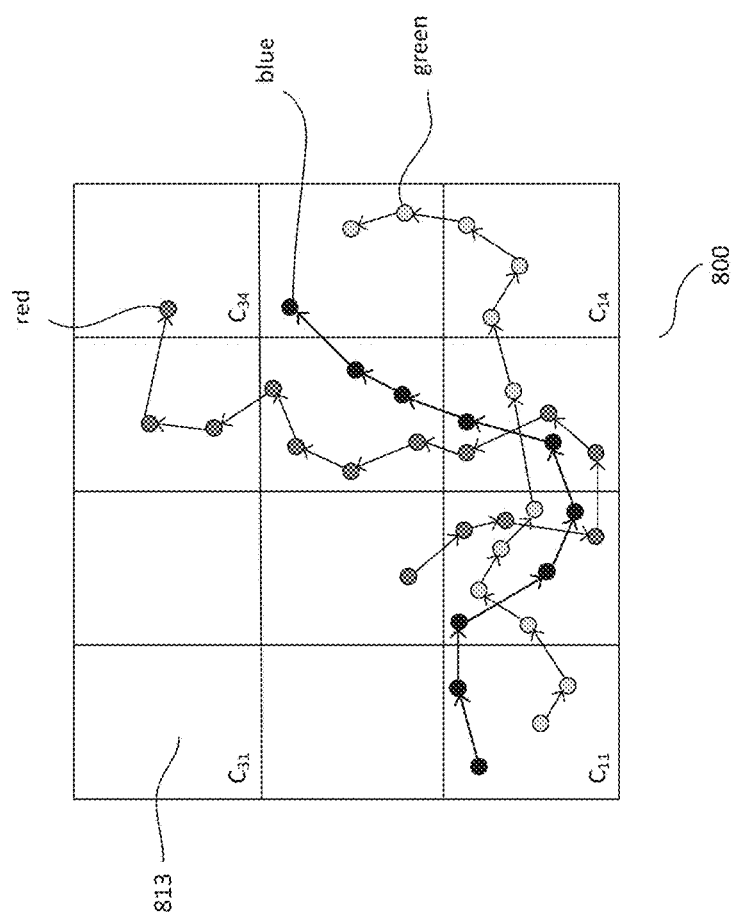
FIG. 8 shows another example of a grid with cell density sequences.

FIG. 8 illustrates a simple example of a grid 800. As show, the grid includes 3 rows and 4 columns of cells 813 (e.g., 3×4 grid). The logs of three users, red, green and blue, are plotted in the grid. A location log is represented by a dot in the grid. The lines connecting the dots represent the movement of the users in sequence. Cell density sequences can be derived from, for example, the cell density table. The cell density sequences of the different users are as follows:

green={$C_{11}(2)$, $C_{12}(4)$, $C_{13}(1)$, $C_{14}(3)$, $C_{24}(2)$};
blue={$C_{11}(2)$, $C_{12}(3)$, $C_{13}(2)$, $C_{23}(2)$, $C_{24}(1)$}; and
red={$C_{22}(1)$, $C_{12}(3)$, $C_{13}(3)$, $C_{23}(4)$, $C_{33}(2)$, $C_{34}(1)$}.

In stage 1, LCS analysis is applied to the cell density sequences of the users. The stage 1 of the LCS produces similarity patterns between different users as follows:

similarity (green, blue)={$C_{11}(2, 2)$, $C_{12}(4, 3)$, $C_{13}(1, 2)$, $C_{24}(2, 1)$};
similarity (green, red)={$C_{12}(4, 3)$, $C_{13}(1, 3)$}; and
similarity (blue, red)={$C_{12}(3, 3)$, $C_{13}(2, 3)$, $C_{23}(2, 4)$}.

A cell density threshold parameter may be defined by the user to the data analyzer 230 to filter out cells where users do not seem to have a significant number of location logs. For example, cells in which a user has less logs than the cell density threshold would be eliminated. The cell density threshold may be, for example, 10. Providing other cell density thresholds may also be useful. The data analyzer may be provided with a default cell density threshold, such as 10. The data analyzer may provide an input option for a user to provide the desired cell density threshold. With this filtering, the similarity mining would result in the analysis of more common regions visited by various user pairs.

In stage 2, the LCS analysis is applied to the cell dwell-time sequences for the different users. The cell dwell-time may be obtained from the cell dwell-time tables of the different users. As an example, cell dwell-time sequences of the different users may be as follows:

green={$C_{11}(40)$, $C_{12}(30)$, $C_{13}(55)$, $C_{14}(30)$, $C_{24}(35)$};
blue={$C_{11}(40)$, $C_{12}(50)$, $C_{13}(35)$, $C_{23}(50)$, $C_{24}(35)$}; and
red={$C_{22}(60)$, $C_{12}(30)$, $C_{13}(35)$, $C_{23}(40)$, $C_{33}(40)$, $C_{34}(30)$}.

The following are similarity patterns based on cell dwell-time sequences from the second stage of the LCS analysis:

similarity (green, blue)={$C_{11}(40, 40)$, $C_{12}(30, 50)$, $C_{13}(55, 35)$, $C_{24}(33, 35)$};
similarity (green, red)={$C_{12}(30, 30)$, $C_{13}(55, 35)$}; and
similarity (blue, red)={$C_{12}(50, 30)$, $C_{13}(35, 35)$, $C_{23}(50, 40)$}.

A dwell-time threshold may be employed in the analysis. For example, cells with less than the dwell-time threshold would be eliminated from the analysis. The dwell-time threshold, for example, may be 30 seconds. Providing other dwell-time thresholds may also be useful. The LCS analysis may be programmed with a default dwell-time threshold, such as 30 seconds. A user may also be provided with the option to input the desired dwell-time threshold for the LCS analysis. For example, the user may input the threshold via the interface. The threshold may correspond to the maximum time difference allowable for determining time similarity between users.

The third stage applies LCS on the combined cell density and cell dwell-time sequences. This can be achieved by performing a simple union of the cell density and cell dwell-time sequences, resulting in a model with two parameters, cell density and cell dwell time. Dwell-time and density thresholds may be defined for the parameters to filter cells from the LCS step. After the LSC analysis, a user similarity score, USS may be derived. The user similarity score may be used to identify users with high similar mobility patterns to a specified user.

The similarity score may be calculated by equation 3 as follows:

$$USS(user_i, user_j) = \frac{\text{count}[\text{similarity}(user_i, user_j)]}{\text{count}[\text{similarity}(user_i, user_i)]} \quad (3)$$

where, similarity ($user_i$, $user_j$), is the similarity pattern between $user_i$ and $user_j$, similarity ($user_i$, $user_i$), is the entire modeled trajectory for $user_j$, and count is the number of similarity.

For example, density and dwell-time similarities as described in stages 1 and 2 of the LCS analysis may be used to determine the USS. For example, in the case of stage 2, where the green user may be denoted as $user_i$ and the blue user may be denoted as $user_j$, the count (similarity(green, blue)) is 4 and the count (similarity(green, green)) is 5. The similarity score USS (green, blue), therefore is 4/5=0.8.

Based on equation 3, the similarity score is from 0 to 1. The closer to 1 or the higher the similarity score, the higher the similarity between the users. A ranking function is then used to pick the top 'n' users similar to a specified user by varying the thresholds for p and δ, where p is the cell density threshold and δ is the dwell-time threshold. The ranking function, for example, compares the USS of each user with all other users and retrieves the top n users to whom the user is similar.

The results of the similarity mining may be displayed. For example, visualization includes plotting the similarity results as a density map (e.g., similarity maps). The density map may be color coded, corresponding to the similarity score. Various filters can be applied to the interface to provide interactive visualization and data mining.

Figure 9:
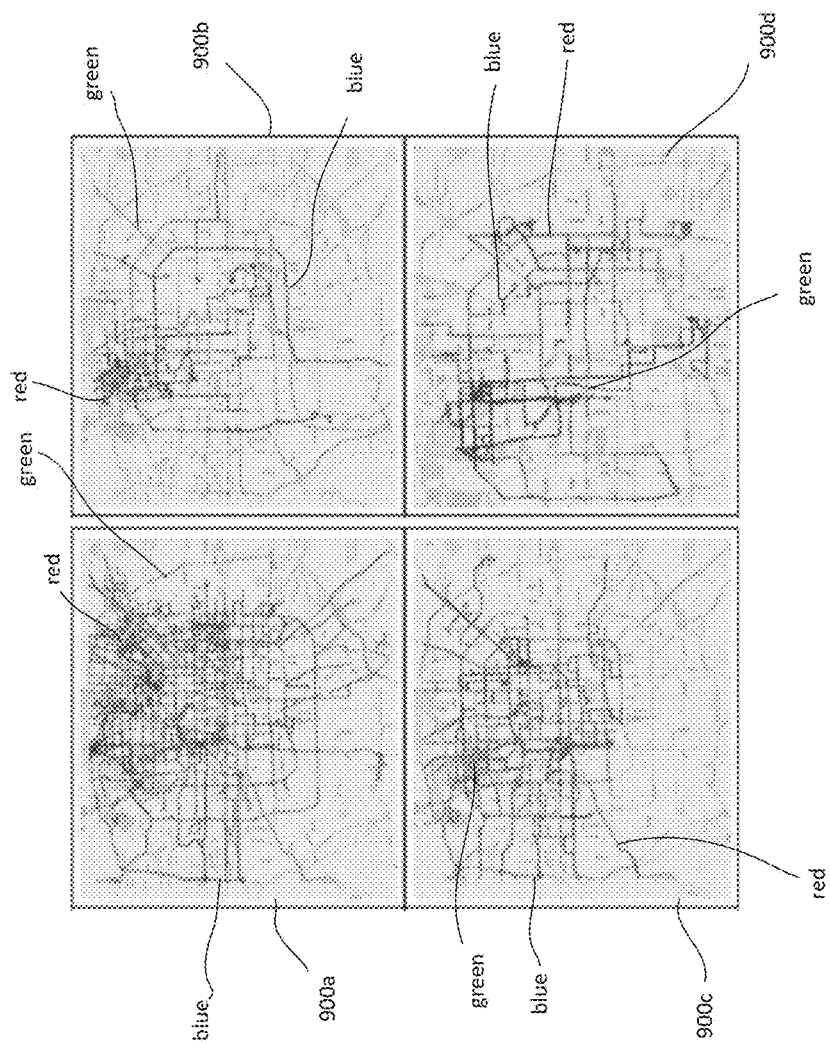
FIG. 9 shows various similarity plots or maps indicating similarity sequences for different pairs of users.

FIG. 9 shows various similarity plots or maps 900a-d indicating similarity sequence for different pairs of users. A map plots trajectories of two users and compares their similarities. A first user is represented by a blue plot, a second user is represented by a red plot and similarities or common trajectory portions of the users are represented by green. The plots visually provide similarities between two users.

Figure 10:
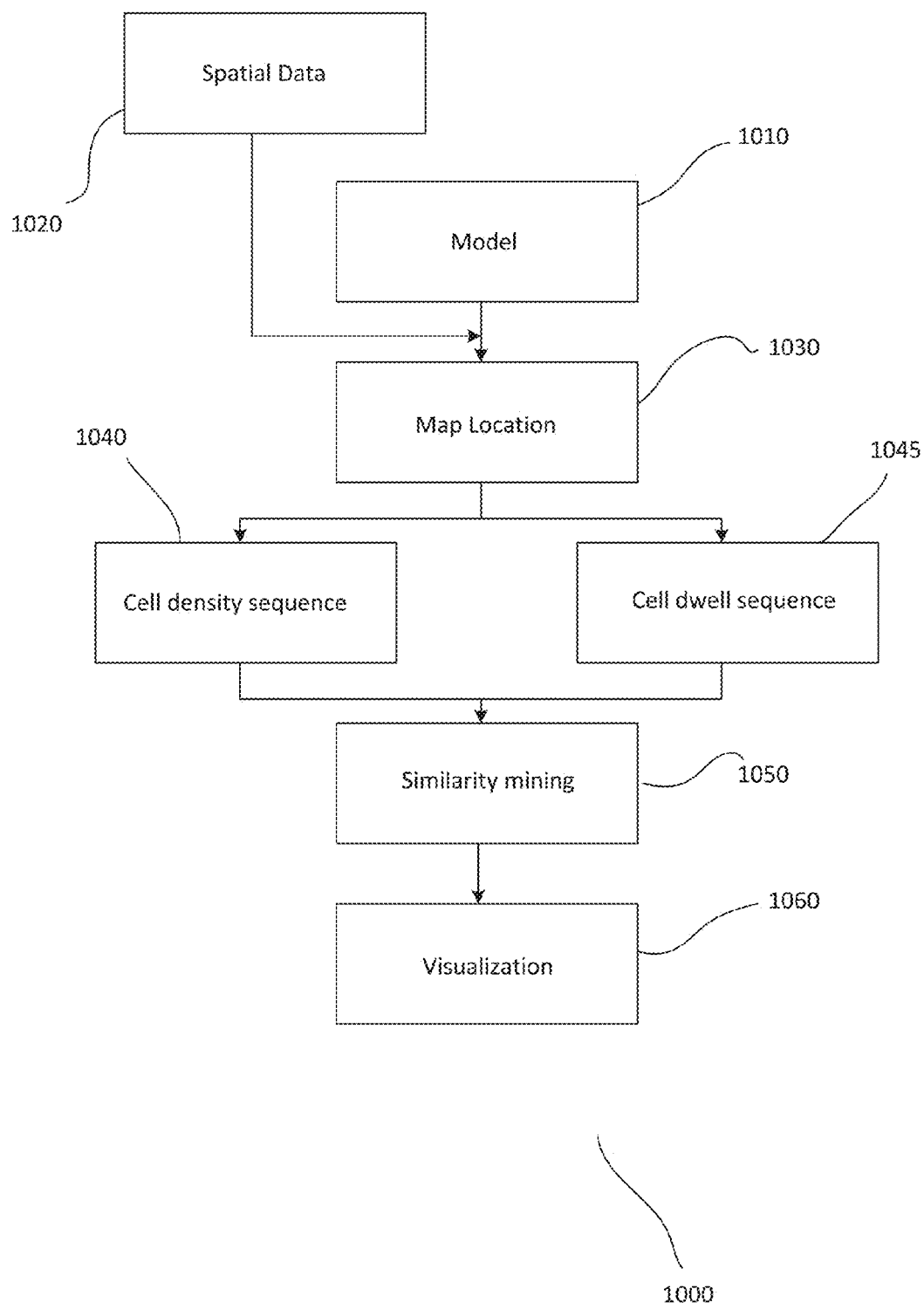
FIG. 10 shows an exemplary implementation of a process for analyzing spatial data.

FIG. 10 shows an implementation of a process 1000 for analyzing spatial data. The process, in one implementation, is performed by an analysis system or tool. At step 1010, a user defines a grid model. The grid model, for example, represents the geographical area of interest. The grid model is a grid having rows and columns of cells. A cell in the grid may be uniquely identified by a cell number. The grid may be defined using a user interface of the analysis system.

At step 1020, spatial data is provided to the analysis system for analysis. The data may be stored in a database of the analysis system. The data, in one implementation, is spatial-temporal trajectory data. The trajectory data tracks trajectories of mobile devices. The trajectories represent trajectories of users associated with the devices. The trajectory data, for example, may be stored as a table in the database. The trajectory data includes various attributes, such as user id, recorded time and location information attributes. Other attributes may also be useful. The user id preferably is an anonymized identifier of the user. The use of anonymized identifiers protects the privacy of users. Providing a non-anonymized identifier as a user id may also be useful. Location data is stored as points in 2-dimensional (2-D) space. For example, the location data may include latitude and longitude information such as WSG84 data. Other types or formats for location data may also be useful.

The spatial data, at step 1030, is mapped to the grid model. In one implementation, the spatial data is mapped to the grid model based on cell number. For example, the modeling module 232 transforms the 2-D data to a 1-D representation as a cell number in the grid. For example, any geo-location pair with latitude and longitude information can be transformed into a transformed or mapped data which is a cell number in the grid. The cell number may be included into the spatial data table as an additional column. For example, the transformed data may be a view generated using the raw data table.

The process continues to generate cell density and cell dwell time sequences of users in the spatial data at steps 1040 and 1045. At step 1050, similarity analysis is performed. For example, the mining module 236 mines the cell density and cell dwell time sequences to determine similarity between user trajectories. At step 1060, similarities may be displayed on a map. Similarities may be indicated, as described in FIG. 9.

The analysis system 120, as described, may be employed to analyze similarities in trajectories of different users. This can lead to recommendations based on similarities of user trajectories. For example, recommendations may include more convenient transportation routes, restaurants as well as new friends. As an illustration, an analyst for a service, such as a marketing service, may use the analysis system to identify similarities in trajectories. Users which have similarities in trajectories, such as visiting a similar geographical location, may be provided with recommendations for restaurants in that location. The recommendations may be pushed to the users through an App provided by the marketing service. Additionally, promotions, such as coupons may be provided to promote various venues. In other exemplary applications, such as social media, the analysis system may serve as a recommendation engine, providing recommendations to members of the media. Other applications of the analysis system may also be useful.

Although the system analyzes 2-D data, it can be modified to analyze 3-D trajectory data. For example, the grid may be a 3-D grid, having latitude, longitude and altitude information. Providing other configurations for the analysis system may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method of analyzing geo spatial trajectories, comprising:
   generating a grid of a geographical area of interest, wherein the grid comprises a plurality of cells that are statically arranged in multi-dimensional space and identified by unique cell numbers;
   receiving a plurality of data points of geospatial trajectory data of a mobile device comprising latitude and longitude components in multi-dimensional space representing a path of movement of the mobile device;

mapping the geospatial trajectory data to the statically arranged cells in the grid in multi-dimensional space, wherein the mapping assigns each data point of the plurality of data points of the geospatial trajectory data to a respective cell number on the grid;

reducing a size of the geospatial trajectory data of the mobile device by transforming the latitude and longitude components of the path of movement in multi-dimensional space into one-dimensional (1D) cell density information comprising a chronological order of statically arranged cells of the path of movement and a number of data points that are detected in each cell, based on the mapping of the plurality of data points to respective cell numbers on the grid; and identifying that a path of movement of a second mobile device is similar to the path of movement of the mobile device based on the of the 1D cell density of information of the mobile device, and outputting information based on the identified similarity via a display.

2. The computer-implemented method of claim 1 wherein:

the geospatial trajectory data comprises log entries stored as a raw trajectory table in a database, attributes of the table include a user id, a location which includes latitude and longitude information, and a time at which data point was recorded, and each data point corresponds to a row in the table and each attribute correspond to a column in the table.

3. The computer-implemented method of claim 2 wherein mapping the geospatial trajectory data comprises generating a cell number for each data point in the raw trajectory table.

4. The computer-implemented method of claim 1 wherein the cell density information comprises a cell sequence of cells visited and number of log entries for each cell in the cell sequence.

5. The computer-implemented method of claim 1 wherein the cell density information further comprises cell dwell-time sequences including a dwell-time of the mobile device for each cell in the cell sequence.

6. The computer-implemented method of claim 1 wherein the identifying is performed based on a similarity analysis that comprises a longest common subsequence (LCS) analysis between trajectories of the mobile device and the second mobile device.

7. The computer-implemented method of claim 6 wherein the LCS analysis comprises:

performing the LCS on cell density sequences of the mobile device and the second mobile device;

performing the LCS on cell dwell-time sequences of the mobile device and the second mobile device; and performing the LCS on a combination of the cell density and cell dwell-time sequences of the mobile device and the second mobile device.

8. A data analysis system comprising:

a non-transitory memory device for storing computer-readable program code; and a processor in communication with the memory device, the processor being operative with the computer-readable program code to perform operation including generating a grid covering a geographical area of interest, wherein the grid comprises a plurality of cells that are statically arranged in multi-dimensional space and identified by unique cell numbers;

receiving a plurality of data points of geospatial trajectory data of a mobile device comprising latitude and longitude components in multi-dimensional space representing a path of movement of the mobile device, mapping the geospatial trajectory data to the statically arranged cells in the grid in multi-dimensional space, wherein the mapping assigns each data point of the plurality of data points of the geospatial trajectory data to a respective cell number on the grid, reducing a size of the geospatial trajectory data of the mobile device by transforming the latitude and longitude components of the path of movement in multi-dimensional space into one-dimensional (1D) cell density information comprising a chronological order of statically arranged cells of the path of movement and a number of data points that are detected in each cell, based on the mapping of the plurality of data points to respective cell numbers on the grid; and identifying that a path of movement of a second mobile device is similar to the path of movement of the mobile device based on the 1D cell density information of the mobile device, and outputting information based on the identified similarity via a display.

9. The data analysis system of claim 8 comprising:

running a frontend subsystem on an end-user device, the frontend subsystem includes an interface;

running a backend subsystem on a server, wherein the backend subsystem comprises a first stage, the first stage includes a database module, and a data analyzer, a second stage that includes a layer to expose data of the first stage, and a third stage that includes a visualization application; and wherein a user interacts with the backend subsystem using the interface.

10. The data analysis system of claim 9 wherein the frontend and backend subsystems communicate using web services.

11. The data analysis system of claim 9 wherein the frontend subsystem comprises leaflet maps for visualizing results of the data analyzer.

12. The data analysis system of claim 8 comprising a characterization module for determining cell density sequences and cell dwell-time sequences of the mobile device.

13. A computer-implemented method of analyzing geospatial trajectories, comprising:

generating a grid of a geographical area of interest, wherein the grid comprises a plurality of cells that are statically arranged in multi-dimensional space and identified by unique cell numbers;

receiving a plurality of data points of geospatial trajectory data of a mobile device comprising latitude and longitude components in multi-dimensional space representing a path of movement of the mobile device;

mapping the geospatial trajectory data to the statically arranged cells in the grid in multi-dimensional space, wherein the mapping assigns each data point of the plurality of data points of the geospatial trajectory data to a respective cell number of the grid;

reducing a size of the geospatial trajectory data of the mobile device by transforming the latitude and longitude components of the path of movement in multi-dimensional space into one-dimensional (1D) cell density information comprising a chronological order of statically arranged cells of the path of movement and a number of data points that are detected in each cell, based on the mapping of the plurality of data points to respective cell numbers on the grid; and identifying that a path of movement of a second mobile device is similar to the path of movement of the mobile device based on the 1D cell density information of the mobile device, and outputting information based on the identified similarity via a display.

14. The computer-implemented method of claim 13 wherein:

the geospatial trajectory data comprises log entries stored as a raw trajectory table in a database;

attributes of the table include a user id, a location which includes latitude and longitude information, and a time at which data point was recorded, and each data point corresponds to a row in the table and each attribute correspond to a column in the table.

15. The computer-implemented method of claim 13 wherein:

the cell density information comprises a cell sequence of cells visited and number of log entries for each cell in the cell sequence.

16. The method of claim 1, wherein the transforming comprises converting two-dimensional (2D) geospatial trajectory data representing the travel path of the mobile device into a 1D sequence of cell numbers and amount of data points in each cell.

17. The method of claim 1, wherein the outputting comprises outputting a recommendation about a future travel destination of the second mobile device based on a comparison of 1D cell density information of the second mobile device with respect to the 1D cell density information of the mobile device.

* * * * *